United States Patent Office 3,240,558
Patented Mar. 15, 1966

3,240,558
NON-CAKING PARTICULATED SALT COMPOSITION AND PROCESS FOR PRODUCING SAME
John F. Heiss, St. Clair, and Richard Kolasinski, Richmond, Mich., and Charles B. Sclar, Columbus, Ohio, assignors, by direct and mesne assignments, to Diamond Crystal Salt Company, Detroit, Mich., a corporation of Michigan
No Drawing. Filed Oct. 24, 1963, Ser. No. 318,490
10 Claims. (Cl. 23—89)

The present invention broadly relates to the treatment of bulk quantities of particulated salt to reduce the caking tendency thereof, and more particularly to an improved anti-caking additive for use in the surface treatment of granulated salt materials which is effective to promote the formation of acicular crystals during repetitive solution and recrystallization of the salt as a result of moisture on the surfaces of the particles thereby preventing the formation of high strength crystalline bonds between adjacent particles.

The tendency of a variety of particulated salt materials to cake forming an integral mass has presented a continuing problem in the efficient handling, shipment, storage and use of bulk quantities of such materials. This problem is particularly serious in connection with the handling, shipment and storage of large industrial bulk quantities of such materials due to the necessity of employing outdoor storage facilities wherein the material is exposed to normal precipitation and wide fluctuations in humidity. While the caking problem of such materials is less serious when they are packaged in containers such as in drums or bags, for example, any caking which does occur during prolonged periods of storage detracts from the efficiency and ease of use of the material and is objected to by the final consumer. The extensive use of conventional crushed rock salt consisting predominantly of sodium chloride for the removal of ice and snow from roads and highways has placed renewed emphasis on the need for an anti-caking agent which is effective to prevent caking of piles of rock salt stored outdoors under freezing conditions.

Crushed rock salt when stored outdoors and exposed to natural precipitation and humidity has been found to form a hard integral crust on the outer surface of the pile such that the interior of the pile is rendered substantially inaccessible by conventional shoveling operations or the like. The hard, caked crusts frequently necessitates resorting to relatively drastic means including power equipment to gain access to the material which is time consuming and costly. In addition, the formation of a thick integral crust of caked salt substantially detracts from efficient use of the material such as the spreading thereof on the surfaces of roadways or the like.

It is now known that the tendency of a variety of particulated salt materials to agglomerate or cake when exposed to the atmosphere is attributable to the repetitive solution and recrystallization of the salt around the peripheral portions of the individual particles as a result of the formation of a layer of moisture thereon and whereby the crystals formed during recrystallization form high strength salt bridges extending between adjacent particles producing an integrally caked salt mass. While the direct exposure of such bulk quantities of salt to natural rainfall and snow aggravates the caking tendency thereof, normal fluctuations in the relative humidity effects sufficient solution and recrystallization of the peripheral portions of the salt particles to produce a strong hard cake during prolonged periods of storage.

It has been found that ordinary crude rock salt will absorb moisture from the atmosphere at a relative humidity above about 75%. The moisture thus absorbed is present on the surfaces of the particles in the form of a layer of solution of the salt. When the relative humidity of the surrounding atmosphere thereafter decreases below about 75%, a progressive drying out of the salt pile occurs effecting a recrystallization of the salt in the solution layer producing salt bridges of the normal cubic crystal system which are of high strength. Repeated cycles of high and low humidity effect a progressive buildup of these salt bridges and a greater depth of penetration into the interior of the salt pile until a relatively thick high strength crust is formed over the pile.

In order to overcome the caking tendency of bulk quantities of particulated salt materials, various techniques have heretofore been employed or proposed for use. One such method for example, comprises the treatment of the surfaces of the salt particles with a water soluble alkali metal ferrocyanide which is effective to change the crystal habit of sodium chloride during its recrystallization promoting the formation of relatively fragile dendritic crystals between adjacent salt particles in lieu of the normal high strength cubic crystals. The dendritic crystals which are of a thin branched structure have a tendency to retain a substantial quantity of water and as a result have been known to freeze into a hard integral mass when subjected to temperatures below freezing. The freezing of the particulated salt treated with such ferrocyanide additives is particularly objectionable when the salt is used by highway departments for de-icing purposes during the winter. The use of ferrocyanide type additives has also been observed to effect a deterioration of the individual salt particles during prolonged storage resulting in the production of a substantial quantity of fines which frequently are undesirable due to the associated dusting problem and are more difficult to convey to the point of final intended use. Probably the most serious shortcoming of ferrocyanide anti-caking additives is their high susceptibility of being leached from the salt pile during prolonged storage resulting in eventual caking of the material.

It is accordingly a principal object of the present invention to provide an improved anti-caking agent for particulated salt materials which is superior to and overcomes the problems associated with anti-caking agents of the types heretofore known.

Another object of the present invention is to provide an improved anti-caking agent for use in the treatment of particulated salt materials either in a powder, flake, granular, or crystalline form which is effective to promote the formation of acicular crystals upon the recrystallization of the salt on the surfaces of the particles preventing the formation of high strength salt bridges and thereby substantially eliminating the caking tendency of the material.

A further object of the present invention is to provide an improved anti-caking agent for particulated salt materials which in addition to its anti-caking properties additionally embodies anti-freeze characteristcs for preventing agglomeration of the particles into high strength integral masses when subjected to atmospheric conditions at subfreezing temperatures.

A still further object of the present invention is to provide an improved anti-caking agent for particulated salt materials which promotes a deviation in its normal crystal habit while concurrently preventing the formation of an excessive quantity of fines resulting from the progressive deterioration of the salt particles as has heretofore been encountered with anti-caking agents of the types heretofore known.

Still another object of the present invention is to provide an improved anti-caking agent for the surface treatment of bulk quantities of particulated salt materials which is not readily leached from the surfaces of the salt particles in spite of prolonged periods of exposure to humidity and normal precipitation.

A still further object of the present invention is to provide an improved anti-caking agent for the surface treatment of bulk quantities of particulated materials which is effective to prevent caking and freezing thereof into an integral mass in spite of its use in comparatively minute quantities.

Still another object of the present invention is to provide an improved anti-caking agent for the surface treatment of bulk quantities of particulated salt materials which is of low cost, of highly effective operation, of sustained effectiveness over long periods of outdoor storage, and of efficient and economical use.

The foregoing and other objects and advantages of the present invention are achieved by applying a water soluble polyvinyl alcohol polymer to the surfaces of the particulated salt material to be treated in an amount sufficient to promote a deviation from its normal cubic crystal habit to an acicular crystal system thereby preventing the formation of high strength salt bridges extending between adjacent salt particles. Conventionally, the use of the polyvinyl alcohol anti-caking agents in amounts ranging from about 0.1 up to about 1 pound per ton of particulated salt material has been found to provide effective anti-caking characteristics over prolonged periods of outdoor storage. In accordance with a preferred practice of the present invention, the surfaces of the salt particles are additionally subjected to a treatment with a gelling agent of which borax constitutes the preferred material to further reduce the solubility of the polyvinyl alcohol anti-caking agent in the salt solution formed on the surfaces of the particles further reducing the tendency of the anti-caking agent to be leached from the material in spite of its exposure to severe moisture conditions.

Other objects and advantages of the present invention will become apparent upon the reading of the following description and the example provided illustrative of a typical embodiment of the present invention.

While the anti-caking agent comprising the present invention is particularly suitable for use on conventional crushed rock salt consisting predominanty of sodium chloride with minor percentages of other salts such as magnesium chloride, calcium sulfate, calcium carbonate, etc., its anti-caking characteristics have also been found of advantage when used with other alkali metal halide salts and particularly potassium chloride. Accordingly, while the following description is particularly oriented to the treatment of conventional crude rock salt particles, it will be understood that the invention is equally applicable to the treatment of other salt compounds and mixtures thereof either in a pure or crude composition which normally have a cubic crystal habit that is modified to an acicular crystal habit in response to the treatment thereof with a polyvinyl alcohol polymer.

The anti-caking agent employed for the surface treatment of a particulated salt material comprises a partially or completely hydrolyzed water soluble polyvinyl alcohol resin. The particular degree of hydrolysis and average molecular weight of the polymer can vary provided that the resultant polymer used is water soluble and preferably forms an aqueous solution of sufficiently low viscosity to enable spray application thereof on the surfaces of the salt particles to be treated. The viscosity of the aqueous polyvinyl alcohol solution is a function of the average molecular weight of the polymer, the degree of hydrolysis thereof, and the concentration used. Conventionally polyvinyl alcohol polymers which are hydrolyzed to a degree of about 99% are designated as completely hydrolyzed whereas those hydrolyzed to a lesser extent are referred to as partially hydrolyzed polymers. Polyvinyl alcohol resins are conventionally prepared by the acid or alkali hydrolysis of polyvinyl acetate polymers. A degree of hydrolysis of about 75% is necessary to impart minimal water solubility characteristics to polyvinyl alcohol resins.

In accordance with the preferred practice of the present invention, it has been found that polyvinyl alcohol resins having a degree of hydrolysis ranging from about 87% to about 100% are particularly suitable for the surface treatment of bulk quantities of particulated salt to inhibit the caking thereof. Polyvinyl alcohol resins of the types suitable for the practice of the present invention are commercially available from Du Pont under the designation Elvanol and are available in a variety of grades differing in their degree of hydrolysis and molecular weight.

Polyvinyl alcohol resins are conventionally supplied in a finely particulated dry powder form which can be added directly to the particulated salt to be treated, or may be combined with fine sized salt particles acting as a carrier which is added to the larger particulated salt. Preferably, the polyvinyl alcohol resin is dissolved in water forming an aqueous solution of the appropriate concentration and viscosity so as to enable its spray application on the surfaces of the salt particles to be treated. The concentration of the polymer in the aqueous solution is controlled so as to provide the appropriate viscosity and to avoid gelling of the solution as a result of standing at room temperature. The gelling tendency of such solutions when excessive concentrations of completely hydrolyzed polyvinyl alcohol resins are employed can be reduced by incorporating a gel inhibitor such as an alkyl aryl polyether alcohol in an amount of from about 0.1% to about 0.2% of the polyvinyl alcohol polymer present. The gelling tendency of completely hydrolyzed polyvinyl alcohol resins can be reduced by simply decreasing the concentration thereof. Partially hydrolyzed polyvinyl alcohol resins do not have a tendency to gel on standing at room temperature and for this reason are preferred. Low viscosity, that is, comparatively low molecular weight polyvinyl alcohol resins having a degree of hydrolysis of from about 87% to about 89%, are particularly desirable since they are soluble in cold as well as in hot water and can be prepared as aqueous solutions containing concentrations as high as 20% without encountering excessive viscosity.

In either event, the polyvinyl alcohol anti-caking agent is applied to the surfaces of the salt crystals to be inhibited in an amount sufficient to promote the formation of acicular crystals during recrystallization of the salt from the layer of salt solution formed on the surfaces of the salt particles during periods of high moisture. The quantity of polyvinyl alcohol employed to provide inhibition against caking of the salt, will vary depending on the storage conditions to which the salt is to be subjected, the length of time contemplated for storage, the total surface area of the salt particles as established by their average particle size, as well as the particular characteristics of the polyvinyl alcohol additive employed. Effective anti-caking protection has been achieved by treating conventional crushed rock salt with a polyvinyl alcohol resin in an amount as low as about 0.1 pound per ton, while an amount of about 0.2 pound up to about 0.5 pound has been found particularly satisfactory under most outdoor storage conditions. Amounts as high as one pound or more per ton can also be employed under severe outdoor conditions but amounts generally in excess of about .5 pound per ton do not provide an appreciable additional anti-caking benefit and the use of such greater quantities is presently uneconomical.

Tests conducted have substantiated the characteristic of the polyvinyl alcohol additive as promoting the formation of acicular salt crystals during the recrystallization of the salt solution present in the layer on the surfaces of the salt particles. The fine needle-like acicular crystals formed are of comparatively low strength preventing the formation of high strength cubic crystalline bridges between the particles as a result of the normal recrystallization habit of the salt as encountered in an untreated particulated salt. The acicular crystals are of low water retention such that the exposure of the salt pile to sub-freezing temperatures does not promote the formation of high strength ice and/or salt dihydrate $$(NaCl \cdot 2H_2O)$$

bridges between adjacent particles effecting agglomeration or caking thereof. This anti-freeze action of the polyvinyl alcohol resin additive constitutes still another advantage of the use of this material in addition to its anti-caking characteristics in comparison to other anti-caking additives heretofore known. The use of ferrocyanide additives of the types heretofore known result in the formation of dendritic crystals which have substantially higher water retentive characteristics such that on exposure of the particulated salt to sub-freezing temperatures the bridges formed by the dendritic salt become frozen, producing a hard integral mass together with the particulated salt particles.

Still another advantage of the use of the polyvinyl alcohol resin additive relates to the substantial reduction in the amount of fines produced during the course of weathering of a bulk quantity of particulated salt treated therewith. In comparison, the use of a ferrocyanide type anti-caking additive has been observed to cause the formation of substantial quantities of fine salt powder which is objectionable due to the decrease in the particle size of the stored salt and the general nuisance associated with the formation of dust and fines during subsequent handling of the material. The reduction in the degradation of the particle size of the salt treated with the polyvinyl alcohol additive in accordance with the practice of the present invention constitutes still another benefit of its use.

As previously set forth, the high water solubility of ferrocyanide type anti-caking agents heretofore known has resulted in the progressive leaching thereof from the salt pile during prolonged storage rendering the salt substantially additive free such that caking eventually occurs. The leaching tendency of the polyvinyl alcohol additive is substantially less due to its limited solubility in concentrated salt solutions. For example, a 10% solution of the polyvinyl alcohol resin additive is insoluble and precipitates in solutions containing a concentration of 14% or more of sodium chloride or potassium chloride. Accordingly, under relatively high moisture conditions wherein runoff of the salt solution formed on the surfaces of the particles occurs, the limited solubility of the polyvinyl alcohol resin additive in such highly concentrated solutions minimizes leaching of the additive from the treated salt.

Under outdoor storage conditions wherein the treated particulated salt is subjected to heavy rainfall, a condition may occur where the runoff liquid does not attain a concentration of the salt of a magnitude which will render the polyvinyl alcohol resin anti-caking agent insoluble. To avoid partial leaching of the additive under such severe moisture conditions, it has been found that the inclusion of a precipitating or preferably gelling agent on the surfaces of the salt particles further reduces the concentration level at which the additive will precipitate substantially eliminating any leaching tendency thereof under heavy rainfall conditions. Precipitation additives which can be satisfactorily employed for this purpose include sodium sulfate ($Na_2SO_4$), potassium sulfate ($K_2SO_4$), sodium carbonate ($Na_2CO_3$), and borax $$(Na_2B_4O_7 \cdot 10H_2O)$$

which is a gelling agent and constitutes the preferred material.

The use of precipitation or gelling additives is particularly desirable in connection with the treatment of particulated sodium chloride and potassium chloride salts which must attain a concentration of 14% before precipitation of a 10% soltuion of polyvinyl alcohol occurs. In contrast, sodium sulfate, potassium sulfate, and sodium carbonate in concentrations as low as 4% effect precipitation of a 10% solution of the polyvinyl alcohol resin additive. Borax is even more effective in producing gelling of the polyvinyl alcohol additive whereby as little as 0.1% to about 0.2% of borax in the solution will cause gelling of a 5% solution of polyvinyl alcohol which is substantially completedly hydrolyzed and about a 1% solution thereof will effect precipitation of a 5% solution of a partially hydrolyzed polyvinyl alcohol having a degree of hydrolysis between about 88% to 89%. In either event, the use of these precipitation or gelling additives and particularly borax further increases the retention of the polyvinyl alcohol additive on the surfaces of the salt particles retarding the leaching thereof during periods of heavy liquid runoff.

The foregoing preciiptation or gelling additives either alone or in admixture can conveniently be applied to the surface of the salt particles to be treated either prior to or after the application of the polyvinyl alcohol polymer additive. The treated salt particles may inherently contain a sufficient small quantity of the aforementioned precipitation or gelling additives as an impurity to promote precipitation or gelling additives as an impurity to promote precipitation or gelling of the polyvinyl alcohol additive at relatively low concentrations preventing a leaching thereof from the treated salt pile. Since the water solutbility of such preciiptation or gelling additives is high, these materials themselves will be progressively leached from the salt pile during prolonged outdoor storage. The quantity of such precipitation or gelling additives used will accordingly vary depending on the moisture conditions to which the stored particulated salt is to be exposed and the leaching problem associated with the polyvinyl alcohol resin additive.

The inclusion of a precipitation or gelling additive in the treated particulated salt, has been found to enable the use of smaller amounts of the polyvinyl alcohol additive to provide comparable anti-caking and anti-freezing inhibition as is attained by greater quantities of the anti-caking additive in the absence of such precipitation or gelling additives. The resulting further economy achieved by enabling the use of lesser quantities of the polyvinyl alcohol resin additive, while maintaining a high level of anti-caking protection of the treated salt makes the use of such a precipitation or gelling additive a preferred practice of the present invention.

In order to further illustrate the effectiveness of the anti-caking additive comprising the present invention the following example is provided. It will be understood however, that the example is included for illustrative purposes and is not intended to be limiting of the scope of the invention as set forth in the subjoined claims.

*Example 1*

In order to evaluate the effectiveness of the polyvinyl alcohol additive comprising the present invention in comparison to untreated particulated salt and particulated salt treated with a ferrocyanide additive of the type heretofore known, three 10-ton samples of coarse crushed northern rock salt were placed outdoors in three separate piles designated A, B, and C in a location exposed to normal rainfall and weather. The typical chemical and physical properties of the coarse crushed northern rock salt employed for the test are as follows.

CHEMICAL PROPERTIES

| Composition: | Percent by wt. average |
|---|---|
| Salt (NaCl) (dry basis) | 98.80 |
| Calcium sulfate ($CaSO_4$) | 0.74 |
| Calcium carbonate ($CaCO_3$) | 0.24 |
| Calcium chloride ($CaCl_2$) | 0.02 |
| Magnesium chloride ($MgCl_2$) | 0.03 |
| Magnesium carbonate ($MgCO_3$) | 0.08 |
| Moisture | 0.08 |
| Insolubles in water | 0.81 |
| Insolubles in acid | 0.005 |

PHYSICAL PROPERTIES

| Tyler | On 0.371 | On 3 | On 4 | On 6 | On 8 | On 10 | On 14 | On 20 | On 28 | Thru 28 |
|---|---|---|---|---|---|---|---|---|---|---|
| U.S.S. Equiv | On 0.371 | On 3 | On 4 | On 6 | On 8 | On 12 | On 16 | On 20 | On 30 | Thru 30 |
| Minimum | 0.0 | 13.9 | 19.4 | 21.8 | 10.5 | 3.7 | 0.9 | 0.1 | 0.1 | 0.2 |
| Average | 0.3 | 17.1 | 24.3 | 23.3 | 17.6 | 10.1 | 3.6 | 1.1 | 0.7 | 1.9 |
| Maximum | 0.8 | 23.4 | 35.1 | 25.6 | 22.6 | 12.6 | 4.8 | 1.8 | 1.6 | 3.3 |

Apparent density, 74.6 lbs./cubic foot.

At the initiation of the test, the salt in pile A was sprayed with 5 gallons of water. The salt in pile B was sprayed with a solution consisting of 2½ pounds sodium ferrocyanide-decahydrate dissolved in 5 gallons of water. The salt in pile C was sprayed with a solution containing 2½ pounds of polyvinyl alcohol dissolved in 5 gallons of water. Of the foregoing treating solutions, approximately 3 quarts remained in the bottom of the spray equipment such that approximately 0.213 pound of sodium ferrocyanide and 0.213 pound of polyvinyl alcohol were added per ton of salt in piles B and C, respectively. After a period of about 4 months, each of the piles were examined. Pile C treated with the polyvinyl alcohol agent was found to be definitely less caked than either the untreated pile A or the pile B treated with the sodium ferrocyanide. The edges of pile C where water had dissolved a portion of the bottom layers of salt were crumbling because the salt had not caked sufficiently to support its own weight. The differences in the caking of the surfaces of the piles were readily visible at a distance of 100 feet.

Another examination of the piles was made one month thereafter employing a pointed bar having a ½ inch square cross section which was employed to determine the relative amount of force required to penetrate through the caked crust of each pile as well as by applying force to the lower edges of the crust of each pile to determine how easily the crust crumbled. In each case the polyvinyl alcohol treated pile C was superior to the other two piles. The crust on pile C was found to be thinner and more easily broken up.

After the expiration of an additional three months test period, samples of salt from the outside of each of the three test piles were poured into containers and placed under subfreezing temperatures of about 15° F. After approximately a one-day freezing period the frozen samples were removed to determine their caking tendency due to the freezing of liquid therein. An examination showed that the crust obtained from pile B incorporating the ferrocyanide additive was frozen the hardest which was believed to be due to the large amount of moisture retained by the dendritic crystals resulting from the ferrocyanide treatment.

Approximately one year after the initiation of the test, each of the three piles were examined. Pile C containing the polyvinyl alcohol additive was observed to have an exterior crust of approximately 2 to 3 inches thick and below which crust the salt was found to be in substantially its original condition. Untreated pile A was observed to have a crust of about 6 to 8 inches thick while the ferrocyanide treated pile B had a crust of from 5 to 6 inches thick. A considerable deterioration of the crystal structure of the salt particles in the outer 6 inches of pile B was observed.

After 17 months from the initiation of the test, each of the test piles were broken into employing a bulldozer. Pile C containing the polyvinyl alcohol additive was found to be the least caked, followed thereafter by the ferrocyanide treated pile B with the untreated pile A being the most difficult to break. The salt in pile C was observed to be of the best appearance being most similar to the salt as originally stored followed by the untreated salt contained in pile A. The ferrocyanide treated salt in pile B was the poorest in appearance. Samples of the salt taken from the interior of piles B and C showed 10.98% of fines (—14 Tyler) for the ferrocyanide treated salt from pile B and only 4.55% fines for the polyvinyl alcohol treated salt from pile C.

The results of the foregoing experimental tests are considered to conclusively establish the superiority of polyvinyl alcohol as an anti-caking and anti-freezing additive over ferrocyanide-type anti-caking additives heretofore known. Moreover, the substantial retention of the stored salt's original appearance and the minimal production of fines as the result of the use of the polyvinyl alcohol resin additive represents a significant improvement over the deterioration of appearance and the production of fines resulting from the use of a ferrocyanide type anti-caking additive.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A non-caking particulated salt composition comprising a plurality of salt particles having a water soluble polyvinyl alcohol polymer on at least a portion of the surfaces thereof.

2. A non-caking particulated salt composition comprising a plurality of rock salt particles having a water soluble polyvinyl alcohol polymer on at least a portion of the surfaces thereof.

3. A non-caking particulated salt composition comprising a plurality of salt particles having a water soluble polyvinyl alcohol polymer on at least a portion of the surfaces thereof and present in an amount ranging from about 0.1 to about 1 pound per ton of said salt particles.

4. A non-caking particulated salt composition comprising a plurality of salt particles having a water soluble polyvinyl alcohol polymer on at least a portion of the surfaces thereof and present in an amount of from about 0.2 to about 0.5 pound per ton of said salt particles.

5. A non-caking particulated salt composition comprising a plurality of salt particles having a water soluble polyvinyl alcohol polymer on at least a portion of the surfaces thereof, said polymer having a degree of hydrolysis ranging from about 87% to about 100%.

6. A non-caking particulated salt composition comprising a plurality of salt particles having a water soluble polyvinyl alcohol polymer on at least a portion of the surfaces thereof, and an additive selected from a group consisting of borax, sodium sulfate, potassium sulfate, sodium carbonate, and mixtures thereof present in an amount sufficient to reduce the solubility of said polymer in an aqueous solution of said salt composition.

7. A method of preparing a non-caking particulated salt composition which comprises the steps of applying a water soluble polyvinyl alcohol polymer to at least a portion of the surfaces of a particulated salt composition.

8. The method as set forth in claim 7 wherein said polymer is applied in the form of an aqueous solution.

9. The method as described in claim 7 wherein said polymer is applied in the form of a finely particulated solid powder and interspersed with said particulated salt composition.

10. A method of preparing a non-caking particulated salt composition which comprises the steps of separately applying a water soluble polyvinyl alcohol polymer to at least a portion of the surfaces of a plurality of salt particles and applying an agent selected from the group consisting of borax, sodium sulfate, potassium sulfate, sodium carbonate, and mixtures thereof to at least a portion of the surfaces of the salt particles in an amount sufficient to reduce the solubility of said polymer in an aqueous solution of said salt composition.

References Cited by the Examiner

UNITED STATES PATENTS 2,056,540　10/1936　Segura _____ 23—89 X
2,734,002　2/1956　Schoeld et al. _____ 23—89 X MAURICE A. BRINDISI, *Primary Examiner.*